July 28, 1959 A. F. DEUTH 2,897,264

SIGNAL TRANSMISSION SYSTEM

Filed April 18, 1955 2 Sheets-Sheet 1

INVENTOR.
ALBER F. DEUTH
BY J. B. Burke
ATTORNEY

SIGNAL TRANSMISSION SYSTEM

Filed April 18, 1955

2 Sheets-Sheet 2

INVENTOR.
ALBERT F. DEUTH
BY J. B. Burke
ATTORNEY

United States Patent Office 2,897,264

Patented July 28, 1959

2,897,264

SIGNAL TRANSMISSION SYSTEM

Albert F. Deuth, Hartsdale, N.Y., assignor to Faximile, Inc., New York, N.Y., a corporation of Delaware Application April 18, 1955, Serial No. 501,897

2 Claims. (Cl. 178—6.6)

This invention concerns a system for transmitting information over long radio circuits where poor signal-to-noise ratios, fading, and bad multipath conditions prevail.

It is known to employ a multichannel facsimile system for transmission of messages, wherein there is employed a multiplicity of scanning and reproducing elements in the terminal equipment. The scanning elements are aligned in a straight row transversely of the line of movement of graphic copy to be transmitted. A correspondingly arranged row of recording elements is disposed at the receiver terminal, with respect to a moving record strip or sheet. Each scanning element is connected to its corresponding recording element via a wire or radio link. It is also known to arrange a plurality of straight rows of scanning elements to scan an elemental area of the graphic copy. All elements scan the area simultaneously, then the copy or the elements are moved to scan an adjacent area of the copy. At the receiver the recording elements are arranged in corresponding rows.

In prior systems such as referred to above, inadequate provision is made for minimizing the effects of severe fading, Gaussian and impulse noise, and multipath conditions including echoes, fading, and noise which occur during transmission of the signals from the scanning elements to the recording elements. Thus if a severely adverse transmission condition should occur one or more successive lines of transmitted copy might be either wholly lost or might be received in so distorted a fashion as to be illegible.

In the present invention it is desired to maximize the comprehension of received intelligence per unit of information transmitted through a noise or otherwise degraded channel. The units of information may be transmitted as characters of an alphabet and/or as numerical digits. These characters are scanned in a plurality of N elemental parallel paths which are transmitted as separate signals and similarly recorded on suitable paper for visual representation. The symbol N herein represents an integer equal to 10 or more. Such a transmission system is basically a facsimile communication system. The effectiveness of such a system will depend ultimately on the efficiency of the human eye as a signal detection apparatus. Nevertheless it is possible to specify the optimum communication and typographical parameters which will yield maximum legibility of a recorded message when transmitted under certain adverse conditions such as fading, multipath, and perturbation by noise. The specified system is intended to be effective over long distance radio transmission circuits where these adverse conditions generally prevail but is equally applicable to long wire lines where severe adverse transmission conditions may occur.

The present invention makes use of a time diversity in the scanning and transmission of adjacent points of copy. N signal transducers are used in a fixed array at a transmitter station. These N scanning elements are arranged in a preselected configuration according to requirements of the system. N transducers are also used at the receiver station for recording received copy. The recording elements are disposed in a configuration or array corresponding to that of the scanning elements at the transmitter. The several scanning elements and the corresponding recording elements constitute transducers which are the terminal points of a plurality of signal transmission channels. A random frequency diversity is also employed between the several channels. The graphic characters transmitted have an optimum arrangement with respect to the disposition pattern of transducer elements.

The frequency division or diversity employed supplements the effect produced by the time diversity or division above mentioned to further minimize the adverse effects of noise, multipath, and fading. Since area scanning is employed the N scanning elements produce N series of signal pulses. These pulses are transmitted simultaneously by modulating N subcarriers each having a different frequency in N transmission channels. The use of N subcarriers reduces distortion of the recorded message because the adverse effects of noise, multipath and fading are not uniformly distributed over the transmitted frequency spectrum. A single side band amplitude modulated multiplex transmission system may be used for transmitting the several modulated subcarriers. The system will employ single sideband transmission preferably to minimize crosstalk between channels.

In prior graphic message transmission systems it has generally been necessary to provide some means of synchronizing the speed of recording with the speed of scanning to obtain a true copy of the original copy. When independent frequency standards are used to control the motors which determine the speeds of the several motors, perfect synchronization exists for only a limited period of time during scanning and recording. A certain amount of skew in the recorded copy will eventually occur resulting in cumulative distortion and requiring adjustment of the recording rate. If synchronizing information is transmitted along with the message signals perfect long-term synchronization is possible only as long as transmission is good. If noise, multipath conditions, or fading occurs, the synchronizing signal may be lost or distorted resulting in serious distortion of the recorded copy. In the present invention precise synchronization of scanning and recording is not required because each scanning element communicates only with its corresponding recording element. It is only necessary that the complete character recording rate be maintained substantially equal to the complete character scanning rate. This results in a considerable simplification in the transmission and recording equipment.

The present invention is particularly adapted to short time secrecy and privacy transmission. Each scanning element is associated with a corresponding recording element. These associated elements are the terminal points of one of N channels. By employing a random or coded distribution of frequencies for the several channels, cumulative secrecy is obtained in transmission. Furthermore, the system permits transmission of recognizable copy even when the noise level exceeds the desired signal level. Thus even where severe jamming and interference conditions may exist, messages can be successfully transmitted. In fact, for security purposes signals masked in noise which considerably exceeds the signal may be transmitted by the present system and readable messages will still be obtained.

It is therefore a principal object to provide a system of graphic communications wherein adverse effects of multipath, noise, fading and interference are minimized.

It is a further object to provide a graphic copy transmission system wherein copy elements are transmitted by an arrangement of scanning elements which introduces a time diversity between the scanning of adjacent copy elements.

It is a further object to provide a graphic copy transmission system including time and frequency diversities in transmission of adjacent copy elements.

It is a further object to provide a graphic copy transmission system in which the arrangement of scanning and recording elements and the configuration of characters in the scanned copy cooperate to produce optimum legibility of the recorded copy in the presence of adverse signal transmission conditions.

The invention will be best understood from the following description taken together with the drawing wherein.

Figure 1:
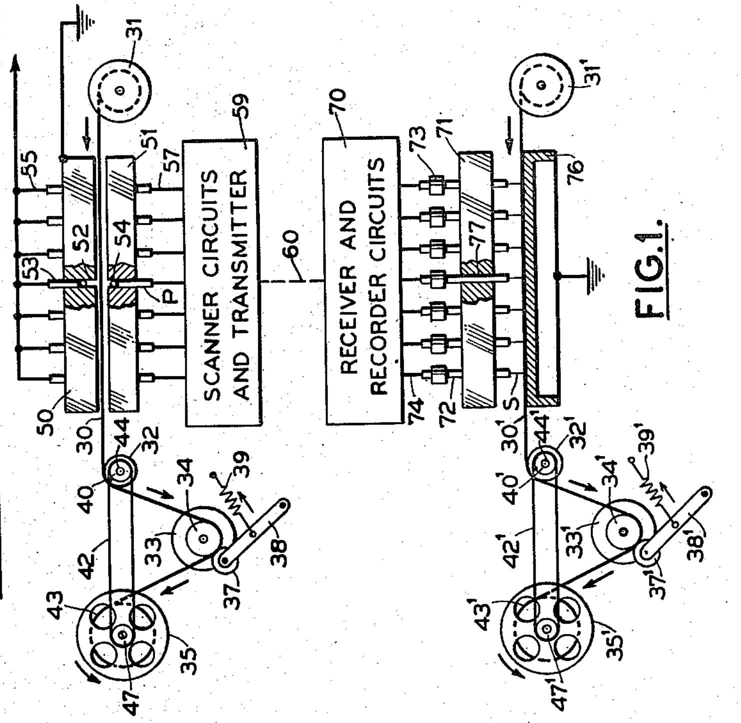
Fig. 1 is a diagram of a transmitter-receiver system embodying the invention.

In Fig. 1 is shown a message carrying film or tape 30 located at signal transmitter station. The tape carries a message to be scanned by the scanning members of the system. The tape is carried on a supply reel 31. The tape is passed over an idler pulley 32 and around drive pulley 34 to takeup reel 35. Pulley 34 is driven by a synchronous motor 33. A pressure roller 37 is carried by an arm 38 biased by spring 39. This roller co-acts with pulley 34 to insure adequate traction for driving the tape. Pulley 40 is carried on the same shaft 44 as pulley 32. A belt 42 carried by pulley 40 drives pulley 47 attached to reel 35 to take up the film on roll 43. The tape is stretched taut between pulley 32 and reel 31 and is passed through a scanning head. The scanning head includes a lamp fixture member 50 and a photocell fixture member 51. Member 50 is a rectangular metal block in which is a plurality of cylindrical bores 52 arranged in a certain pattern. In each bore is a small lamp 53. Member 51 is a similarly shaped block in which are bores 54 aligned with the bores 52 in the same pattern. A photocell P is disposed in each bore. The lamps 53 are energized via wires 55. Conductors 57 extend from each photocell to a multichannel transmitter 59. In the transmitter the several signal channels are multiplexed and transmitted via a single wire line or radio link 60 to a multichannel receiver 70 located at a receiver station.

Figures 1A, 3:
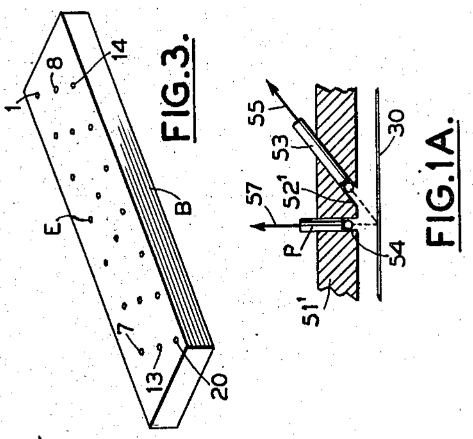
Fig. 1A shows an alternative arrangement of scanning elements.
Fig. 3 is an isometric view of a scanning or recording head block.

The tape 30 utilized in the arrangement described may be transparent. If photographic film is used the film may carry the message to be scanned and transmitted as a negative or as a positive print. It is also possible to use an opaque tape instead of transparent film. The photocells P will then scan the tape by reflected light. In Fig. 1A is shown one way for scanning by reflected light. A bore 52' is obliquely disposed near each bore 54 in block 51'. In each bore 52' is a lamp 53 which illuminates the spot on tape 30 scanned by photocell P.

Figure 2:
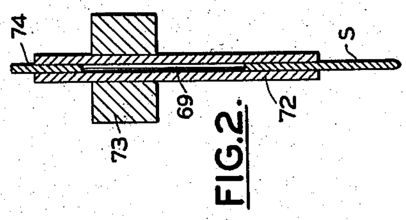
Fig. 2 is an elevational sectional view of a stylus assembly.

At the receiver station is a recorder head block 71 which is provided with bores 77 arranged in the same pattern as the bores 54 of the scanner block 51. A stylus holder 72 is disposed with a sliding fit in each bore 77. Each stylus holder has a bore 69 in which is carried a stylus S as clearly shown in Fig. 2. A lead weight 73 is secured to the exterior of tube 72. Wires 74 are connected to receiver-recorder 70 and terminate in the bores 69 of the several styli carriers 72. An electrical recording tape 30' passes over platen 76. Styli S are held in contact with the tape by the weights 73 because as the styli wear, the styli holders are gravity fed through bores 77. The tape 30' is fed from a reel 31' and in a manner similar to that at the transmitter station passes around idler pulley 32' and drive pulley 34' to roll 43' on reel 35'. Synchronous motor 33' drives pulley 34' to pull the tape over the platen under recording head block 71. A belt 42' driven by pulley 40' is mounted on the same shaft as pulley 32' and drives pulley 48' which is attached to reel 35' so that the tape is taken up on the reel. Pressure roller 37' maintains traction of the tape on pulley 34'. Arm 38' carries the roller and is loaded by spring 39'.

Figure 4:
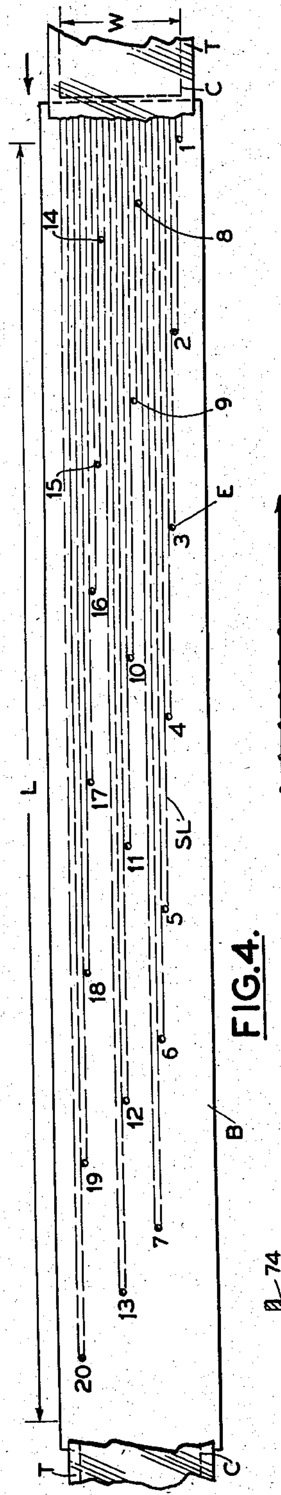
Fig. 4 is a plan view of an arrangement of a scanner head or a recorder head for obtaining time diversity in transmission and reception of signals.
Figures 5, 6, 7, 8, 9, 10, 11, 12, 13, 14:
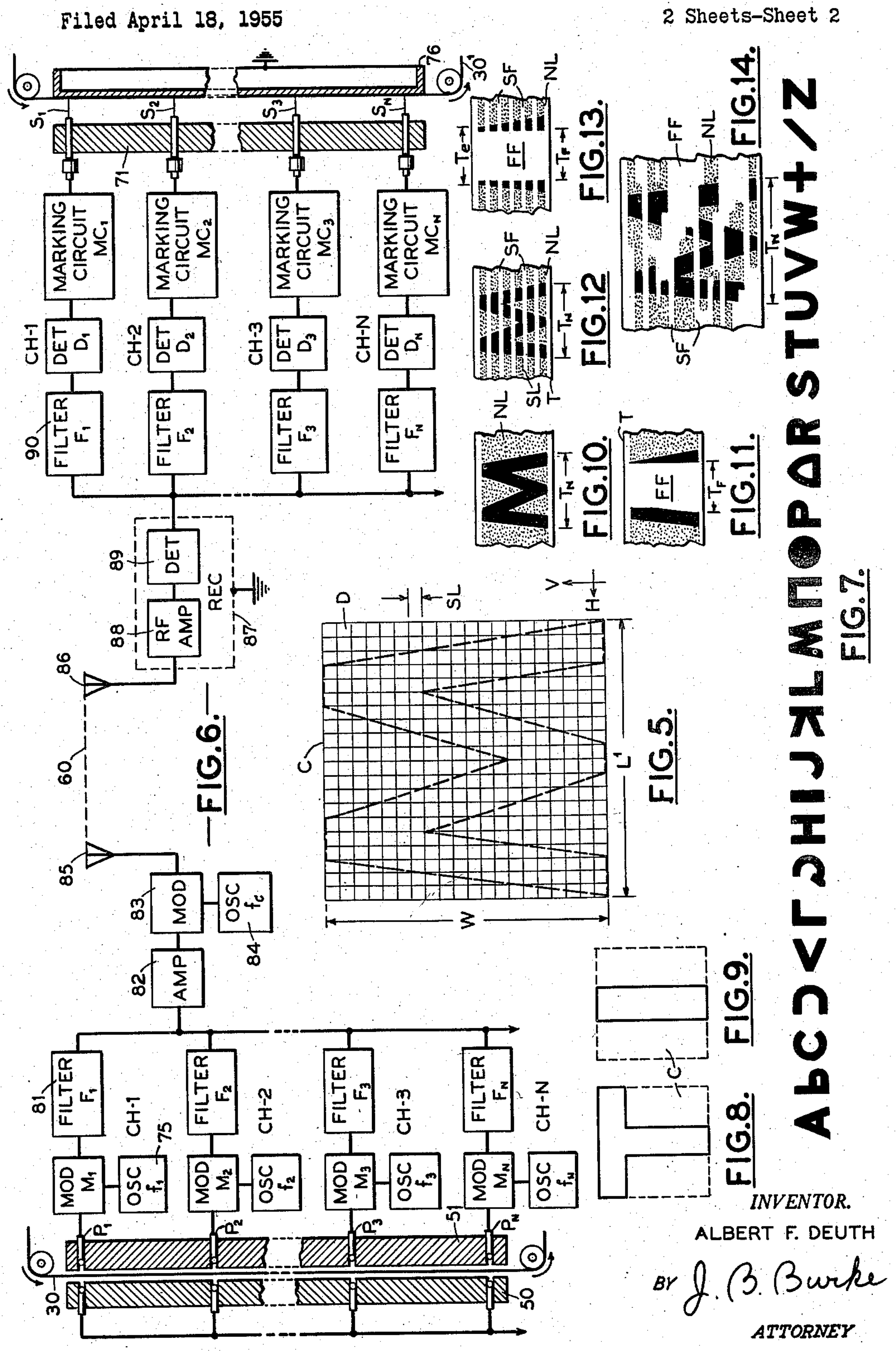
Fig. 5 shows a character matrix which may be employed in the system.
Fig. 6 is a more detailed diagram of a transmitter-receiver system embodying the invention.
Fig. 7 shows an alphabet conforming to preferred typographical parameters.
Figs. 8 and 9 show characters conforming to preferred typographical parameters inscribed in square character matrices.
Figs. 10–14 show samples of records made under varying transmission conditions.

In Figs. 3 and 4 are shown a block B which may have a plurality of bores E arranged in a predetermined pattern. The block may be used as are members 50, 51 at the scanner and member 71 at the recorder. Bores E will then correspond to bores 52, 54 and 77 respectively. Thus each bore will carry a scanner element such as lamp 53 or photocell P, or a recorder element such as stylus holder 72. The tape T may be used for scanning or recording purposes. The tape used at the transmitter station will carry appropriate characters representing a message to be transmitted. The tape used at the receiver will record the characters corresponding to those transmitted from the scanner. The bores E are disposed in each block in such a pattern that the total length L thereof in the direction of travel of the tape is five to ten times the length L' of a square character matrix C as shown in Fig. 5 to be scanned or recorded.

The width W of the pattern is equal to the width W of the matrix C. The bores E are disposed in individual rows or scanning paths SL with one bore in each row. Twenty rows are shown in Fig. 4 but more or less, but not less than five rows, may be used. Bores in adjacent rows are spaced lengthwise of the tape by any predetermined distance but not less than length L' of matrix C. The factors which determine these distances are further explained below but it will be noted that no two bores are aligned in a transverse direction across the block i.e. perpendicular to the direction of travel of the tape. Also no two bores are aligned in an oblique direction corresponding to any slanted element of any character. Thus when the tape is carried through the scanner a time differential necessarily exists between the scanning of adjacent points on each scanned character.

In the foregoing system as described and illustrated only narrow tape has been referred to as used for scanning and recording. It is of course possible to use any desired width tape or continuous sheet for scanning and recording. If wider copy is to be scanned, the width of blocks 50, 51 should be expanded. More scanning elements will be required and the pattern of scanning elements will include an increased number of rows SL. A corresponding increase in size of the recording block 71 and the pattern of recording styli will be required.

The relative sizes of the characters scanned and recorded are important for determining the speeds of motors 33, 33' and the sizes of the blocks 51 and 71. If the sizes of characters to be recorded are to be the same as the sizes of characters scanned, then the two motors should advance the scanned and recording tapes substantially the same linear distance per unit time. It will be sufficient if both synchronous motors are energized for example by 60 c.p.s. power sources so that they operate at substantially constant and equal speeds. When the recorded characters are smaller than the scanned characters, the recording block 71 should be narrower and shorter than block 59 in the proper proportionate size. The speed of motor 33' should then be such that length of time required to record one character is equal to the time required to scan one character at the transmitter station. If desired suitable gear trains may be provided between motors 33, 33' and pulleys 34, 34' to fix appropriate tape advance speeds.

In Fig. 6 is shown one system in which the invention may be embodied. The photocells $P_1, P_2, P_3, \ldots P_N$ are supported in a block 51 in such a pattern that there will be as many scanning paths as there are photocells. The photocells will be spaced apart to provide the essential time diversity between scanning of adjacent points on the tape 30 as explained in connection with Fig. 1. The photocells are the transmitting terminals of channels CH–1, CH–2, CH–3 . . . CH–N. The photocells are connected to modulator circuits $M_1, M_2, M_3, \ldots M_N$. Subcarrier oscillators 75 having different assigned frequencies $f_1, f_2, f_3, \ldots f_N$ are also connected to the modulators. The output signals are thus applied from the photocells to modulate the subcarriers. Filters 81 designed to pass different frequency bands $F_1, F_2, F_3, \ldots F_N$ are connected to the modulator circuits and thence in common to amplifier 82 and a radio frequency modulator 83 which is preferably a single sideband modulator. An oscillator 84 applies a carrier of frequency $f_c$ to the modulator. The modulator output is fed to an antenna 85 for radiating the multiplexed signals therefrom.

Receiving antenna 86 receives the radiated signals over a path or paths 60 and applies the signals to a receiver 87 including a radio frequency amplifier stage 88 and a detector 89. The audio output of the detector is applied to the several recording channels. The channels include band pass filters 90 for passing the several frequency bands $F_1, F_2, F_3, \ldots F_N$ to detector circuits $D_1, D_2, D_3, \ldots D_N$. The marking circuits $MC_1, MC_2, MC_3, \ldots MC_N$ are connected to the detectors and each circuit applies the recording signal for its own channel to the corresponding stylus $S_1, S_2, S_3, \ldots S_N$ to mark the moving recording tape. The styli constitute the recording terminals of channels CH–1, CH–2, CH–3, . . . CH–N.

In Fig. 5 is shown a preferred form of character cell or character matrix. The cell is square and has at least five but preferably twenty or more elements in each direction V and H representing equal horizontal and vertical definition. If N is a number equal to the number of scanning lines or paths SL per character in direction V ($W=N\times SL$) and also equals the number of square matrix elements D per path SL in direction H ($L'=N\times D$) then $N^2$ equals the number of matrix elements D per character. Each element D represents an elemental square matrix area having a length and width equal to the width of a scanning path SL. Since the present invention employs a multichannel transmission system of comparatively high definition, N channels are employed to transmit information in parallel with time. The N scanning paths per scanned character require N scanning elements or units and are arranged in a pattern to view N spots along the adjacent parallel paths SL disposed across the characters marked serially on tape 30. The N outputs of the N scanning units modulate N subcarriers of individually different frequencies $f_1, f_2, f_3, \ldots f_N$. The N subcarriers modulate a radio frequency carrier of frequency $f_c$ which is transmitted to receiver 70. At the receiver the carrier is demodulated and the N subcarriers are passed via filters 90 to the N marking circuits $MC_1$—$MC_N$. Each marking circuit furnishes current for N marking electrodes $S_1$—$S_N$, arranged across the recording tape 30' in the same pattern as that of the scanning units. Because of the large number of individual channels this system does not require the highest possible order of synchronization although the time designated hereafter $T_n$ required to scan one character should be equal to the time required to record that character.

This system is adapted to overcome two effects caused by a multipath condition wherein the signals travel over two or more paths between transmitter and receiver. These effects are: 1. Echoes 2. Fading.

*Echoes*

To overcome effect of echoes, the time $T_n$ required to record one element of a character must be made equal to or greater than the echo or dispersion time $T_e$ of the radio transmission channel. Thus $$T_n \geqq T_e$$

If R represents the number of characters transmitted and recorded per second, $$T_n=\frac{1}{R\times N}$$

Suppose $T_e=10\times 30^{-3}$, or 10 milliseconds. This would be a very long echo time and rarely occur in practical radio circuits. Let the number N of scanning paths be twenty, then $$R=\frac{1}{T_e\times N}=\frac{1}{10\times 10^{-3}\times 20}=5\frac{\text{characters}}{\text{seconds}}$$

A recording speed of five characters per second would be equivalent to fifty words per minute if five is taken as the average number of characters per word and the spaces between words are each equal to one character. The keying frequency will be 50 c.p.s. and the frequency bandwidth will be 100 c.p.s. The parameters here stated will insure substantially no degration of signals recorded due to multipath echoes up to 10 milliseconds duration and will allow tolerable degradation for the extremely rare echoes extending beyond 10 milliseconds. At the same time poor signal-to-noise ratios as low as 10 db less than unity will not cause intolerable distortion or illegibility.

*Fading*

Fading is a condition in which variation in amplitude of message signals occur. It may affect only certain frequencies at any one instant and is then referred to as selective fading. If, as rarely occurs, all or substantially all the transmission band is affected, the condition is referred to as flat fading. The principal effect of fading in a system is to subtract information from the information signals. The solution to the flat fading condition is provided in this system by randomizing the fading effects, and by providing such a wide signal transmission frequency bandwith that only a fraction of its many frequency components can be simultaneously attenuated by the fading characteristics of the radio transmission path, so that on the average there are always present a certain number of relatively unattenuated frequency components. The time diversity coding of the transmitted character elements is such that the best statistical use of the unattenuated components is made.

This can be accomplished by providing that:

(1) The minimum possible number of matrix elements D of a single character are transmitted at the same time.

(2) The transmission of all matrix elements of an individual character are accomplished in a period of time greater than that of a prolonged flat fade.

(3) The transmission of character elements is as random as possible.

Items 1, 2 and 3 are all accomplished because the positions of the scanning and recording elements along the direction of tape motion are staggered in identical patterns with no two elements disposed in the same line across or along the tape. In addition the effects of selective fading are minimized by providing a sufficiently wide bandwith for all channels and by providing that the bandwidths of the channels including scanning and recording elements which are physically closest together in the staggered pattern are farthest apart in frequency.

There is an optimum choice of frequencies for each pattern of scanning and recording elements which may be used.

*Noise*

The present system minimizes the effects produced by two types of noise, namely impulse noise and Gaussian noise. The staggered arrangement of scanning and recording elements herein provided affords protection against impulse noise. Since impulse noise is of very short duration occurring in momentary bursts, while recording of each character occupies an extended period of time which may be of the order of two seconds only a minimum number of character elements are degraded during transmission of a character. Thus legibility of the recorded character is impaired to a minimum extent.

Gaussian noise is random in nature and is in effect a random variation of amplitudes akin to fading except that extraneous signals may be added to the transmitted information. This condition is minimized in the present invention by providing adequate definition and bandwith for the poorest signal-to-noise ratio to be encountered. It is thus possible in the present system to tolerate signal-to-noise ratios which are considerably less than unity. In fact Gaussian noise perturbation of the message signal can be permitted to almost any degree by providing a sufficient number of channels to record legible characters.

*System parameters*

A number of parameters of a system will now be cited as an example of one system which will accomplish the purposes of the invention. In the system of Fig. 6 a suitable bandwith for each channel CH–1 . . . CH–N may be eighty cycles with subcarrier frequencies $f_1$ to $f_n$ of the oscillators 80 ranging from 550 c.p.s. to 2925 c.p.s. at increments of 125 c.p.s. A character size at the scanner of about one-half inch and a character size at the recorder of about one-quarter inch may be used. There will be at least 400 (20×20) character elements D per square matrix as indicated in Fig. 5. This affords acceptable legibility in the presence of a measurable signal-to-noise ratio as low as 10 db less than unity. If the number of character elements D per inch are increased signal-to-noise ratios of even lower magnitudes may be tolerated. In other words, the system will provide legible message transmission even though the noise level considerably exceeds the message level. This is a result not heretofore attainable with any prior known system of comparable nature. In the present system the speed of the scanner tape with the above mentioned parameters may be about 2½ inches per second and the speed of recorder tape 30' may be about 1¼ inches per second. The length L of the scanning pattern should be about five to ten times that of the character to be scanned and recorded. Thus the pattern on block 59 may well be about 5 inches long and the pattern on block 71 will be about two and one-half inches long. This arrangement provides a character scanning and recording time of about one-fifth second. It is possible to employ a longer character scanning time and adjust the total frequency bandwidth and number of channels accordingly. A longer transmitting time will slow up message transmission somewhat but legibility will then be maintained in the presence of a more adverse signal-to-noise ratio.

In order to insure that adequate frequency diversity exists between each pair of channels terminating in transducers which scan or record on adjoining paths along the tapes, the assigned frequency ranges for these "adjoining" channels should be separated on the average as far apart as possible in the total frequency spectrum occupied by all the channels.

*Typographical parameters*

The typographical parameters of characters which will produce most legible copy when transmitted and recorded by the present system under adverse transmission conditions may be stated as follows. Capital letters rather than lower case letters are preferable when typed or printed copy is transmitted. Characters may be spaced fairly closely together. The stroke should be such that the area of the character occupies about 50 percent of the character matrix equal in area to the rectangle circumscribed around the widest character to be transmitted. Thus in Fig. 5, the letter M occupies substantially one-half the area of the matrix cell. In general the stroke should be equivalent to 25 percent of the maximum height of characters to be transmitted. Thus as shown in Figs. 8 and 9 the characters "I" and "T" each have a stroke width W which is substantially one-quarter of the character height L'. It has been found that optimum legibility of recorded characters occurs at approximately 20 elements D per matrix height or 400 elements per square matrix where the characters recorded have a maximum height no longer than one-quarter inch.

In Fig. 7 are shown specimen characters of an alphabet conforming to the typographical parameters above mentioned. Each character occupies about one-half the area of a square character cell. Such characters are recorded with optimum legibility when transmitted by the present system under adverse conditions such as noise, multipath and fading. It is of course possible to use other alphabet forms with the present system. If handwritten characters are to be scanned they should be at least one-quarter inch in size and preferably even larger. The recorded character size should be no larger than one-quarter inch and preferably smaller. The range of one-tenth to one-sixth inches for the height of recorded capital letters has been found to provide optimum legibility for quite degraded copy representing a signal-to-noise level of about unity for a scanning system employing at least twenty parallel scanning paths per character.

The parameters cited above will not necessarily be optimum in all cases and should be taken as illustrative only. The particular parameters to be used in any system will be necessarily chosen in accordance with the requirements of the system depending on the relative severity of each type of adverse transmission condition encountered.

The particular advantages derived by employing time and frequency diversity as explained above for a signal transmission system may be best illustrated by graphic examples of records made under adverse transmission conditions as shown in Figs. 10–14. The results of using frequency diversity without time diversity are also shown. In Fig. 10 is shown a character M as recorded on a tape T during time $T_n$, under conditions when all channels were transmitting and recording. The transmitted character M is legible above the background noise NL. In Fig. 11 is shown the effect of a deep flat fade during time $T_F$ if no time diversity arrangement is employed, for example where the several scanning and recording elements are aligned in one or more straight rows across the tape T. The entire record has been lost during the time $T_F$ of the fade as shown at FF in Fig. 11.

In Fig. 12 is shown the effect of selective fading in a system employing frequency diversity between channels but no time diversity in scanning. Part of the transmitted character is lost in record areas SF. The recorded character M is still legible because of the use of frequency diversity between the several channels, even though the signals were lost in one-half to two-thirds of the channels due to selective fading. Fig. 13 shows the effect of an unusually severe transmission condition in a system employing frequency diversity between channels but no timed diversity in scanning. A deep flat fade FF on all channels occurs during time $T_F$ and during the remainder of the recording time background noise NL and selective fading SF almost entirely obliterate the record of the transmitted character.

Fig. 14 shows the effect of employing time diversity as well as frequency diversity in the system as disclosed herein. In spite of selective fading causing loss of record areas SF, of background noise NL which tends to obscure the record, and of flat fading occurring for as much as one-half to two-thirds of the recording period $T_n$, the transmitted character still is legible. Note that the extensive areas FF of the record lost because of flat fading are broken up and scattered due to time diversity in transmission so that legibility is still retained while in the examples of Figs. 11 and 13 where no time diversity is used legibility is lost at FF during the time $T_F$ of the flat fade condition.

The present invention makes it possible to design a multichannel system wherein graphic characters may be transmitted and legibly recorded under almost any adverse signal-to-noise ratio and multipath condition. The several channels will have different frequency components as indicated above. For any particular rate of transmission of bits of intelligence which may be desired, almost any adverse signal-to-noise ratio may be tolerated in such a system by provision of a total transmission frequency bandwith for all channels according to the relationship:

$$B_T = W_b \log\left(1+\frac{S_a}{N_a}\right)$$

Where B is the rate of transmission of bits of intelligence, $S_a$ and $N_a$ are the amplitudes of signal and noise respectively and $W_b$ is the transmission frequency bandwidth.

Although only a limited number of embodiments of the invention have been disclosed, it will be apparent to those skilled in the art that many changes are possible without departing from the invention as defined in the appended claims; for examples: more or less than twenty scanning paths SL may be used. The block B may be cylindrical in form or a section of a cylinder instead of a flat block. Instead of using the plurality of lamps 53, one or more elongated fluorescent lamps disposed parallel to tape 30 to illuminate the scanning paths may be used. Also differently formed characters than those shown in Fig. 7 may be used.

What is claimed and sought to be protected by Letters Patent of the United States is:

1. A graphic signal transmission system for transmitting and recording readable characters under conditions of continuous random noise where the signal-to-noise ratio is less than unity, of prolonged fading occurring randomly on different signal transmission frequencies, and of echoes occurring for time periods of random lengths, comprising a tape carrying characters to be scanned, each of the characters conforming in length and width to a rectangular matrix of predetermined length and width, N scanning elements disposed in a staggered pattern in N adjacent parallel paths whose total width equals the length of the character matrix, N being a number not less than five, there being only a single scanning element in each of the paths so that each element scans only $$\frac{1}{N}$$

of the length of said matrix, said scanning elements being spaced apart from each other along the length of the tape over a distance at least five times the width of the character matrix, the spacing of elements in adjacent paths exceeding the width of said matrix, means for transmitting on different frequencies of a predetermined bandwidth the signals generated by the respective scanning elements, the transmission frequencies for signals generated by those elements disposed closest together being furthest apart in said bandwidth, and means for advancing the tape lengthwise at a predetermined speed past said scanning elements such that each character is scanned in a time less than the longest of the echo and flat fading times of the transmitted signals.

2. A graphic signal transmission system for transmitting and recording readable characters under conditions of continuous random noise where the signal-to-noise ratio is less than unity, of prolonged fading occurring randomly on different signal transmission frequencies, and of echoes occurring for time periods of random lengths, comprising a tape carrying characters to be scanned, each of the characters conforming in length and width to a rectangular matrix of predetermined length and width, N scanning elements disposed in a staggered pattern in N adjacent parallel paths whose total width equals the length of the character matrix, N being a number not less than five, there being only a single scanning element in each of the paths so that each element scans only $$\frac{1}{N}$$

of the length of said matrix, said scanning elements being spaced apart from each other along the length of the tape over a distance at least five times the width of the character matrix, the spacing of elements in adjacent paths exceeding the width of said matrix, means for transmitting on different frequencies of a predetermined bandwidth the signals generated by the respective scanning elements, the transmission frequencies for signals generated by those elements disposed closest together being furthest apart in said bandwidth, means for advancing the tape lengthwise at a predetermined speed past said scanning elements such that each character is scanned in a time less than the longest of the echo and flat fading times of the transmitted signals, and a receiver for said transmitted signals, said receiver comprising a plurality of recording elements disposed in a pattern corresponding to the pattern of scanning elements so that each recording element records only $$\frac{1}{N}$$

of the length of a recorded character, the spacing of said scanning and recording elements in said pattern and the distribution of said transmission frequencies resulting in recording a readable part of each transmitted character regardless of the noise, echo and fading conditions encountered by the transmitted signals.

References Cited in the file of this patent

UNITED STATES PATENTS

| | | |
|---|---|---|
| 1,649,819 | Fell | Nov. 22, 1927 |
| 2,198,248 | Hansell | Apr. 23, 1940 |
| 2,420,802 | Thompson | May 20, 1947 |
| 2,446,635 | Cooley | Aug. 10, 1948 |
| 2,730,694 | Williamson | Jan. 10, 1956 |
| 2,779,654 | Williamson | Jan. 29, 1957 |